(12) United States Patent  
Kuperman et al.

(10) Patent No.: US 10,924,567 B2  
(45) Date of Patent: Feb. 16, 2021

(54) DETERMINING ACTIVE APPLICATION USAGE THROUGH A NETWORK TRAFFIC HUB

(71) Applicant: Cujo LLC, El Segundo, CA (US)

(72) Inventors: Leonid Kuperman, Los Angeles, CA (US); Attila Egri, El Segundo, CA (US); Gabor Takacs, Gyor (HU); Paulius Ulozas, El Segundo, CA (US)

(73) Assignee: Cujo LLC, El Segundo, CA (US)

( * ) Notice: Subject to any disclaimer, the term of this patent is extended or adjusted under 35 U.S.C. 154(b) by 0 days.

(21) Appl. No.: 16/440,997

(22) Filed: Jun. 14, 2019

(65) Prior Publication Data

US 2020/0076910 A1  Mar. 5, 2020

Related U.S. Application Data

(60) Provisional application No. 62/723,484, filed on Aug. 28, 2018.

(51) Int. Cl.
*H04L 29/08* (2006.01)
*H04L 12/26* (2006.01)
*H04L 29/06* (2006.01)

(52) U.S. Cl.
CPC .......... *H04L 67/22* (2013.01); *H04L 43/0876* (2013.01); *H04L 43/0894* (2013.01); *H04L 63/0428* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,987,611 A | * | 11/1999 | Freund .................. G06F 21/552 726/4 |
| 8,964,582 B2 | | 2/2015 | Wilkinson |
| 9,237,460 B2 | | 1/2016 | Ye |

(Continued)

OTHER PUBLICATIONS

Reid, Doug. "CUJO Smart Internet Security Firewall Reviewed." Published Sep. 13, 2016 at <https://www.smallnetbuilder.com/lanwan/lanwan-reviews/33018-cujo-smart-internet-securit> (Year: 2016).*

(Continued)

*Primary Examiner* — Scott B Christensen
(74) *Attorney, Agent, or Firm* — Withrow & Terranova, PLLC

(57) ABSTRACT

A network traffic hub receives network traffic from a user device running an application. The network traffic hub aggregates the network traffic into augmented netflows. Based on netflow parameters extracted by the network traffic hub, one or more augmented netflows are associated with the application. The network traffic hub determines whether an augmented netflow is a result of the application being in an active state or a passive state based on, for example, the quantity of data within the netflow. If the quantity of data within the augmented netflow is larger than a data threshold, the augmented netflow can be classified as an active usage, and if the data is less than the data threshold, the augmented netflow can be classified as a passive usage. Thus, by classifying network traffic of an application as active or passive, a record of a user's active usage of the application can be recorded.

21 Claims, 8 Drawing Sheets

(56) References Cited

U.S. PATENT DOCUMENTS

| | | | |
|---|---|---|---|
| 9,819,592 | B2 | 11/2017 | Meredith et al. |
| 10,205,831 | B1* | 2/2019 | Yan .................... H04L 12/1403 |
| 10,432,539 | B2 | 10/2019 | Wasay et al. |
| 10,554,507 | B1 | 2/2020 | Siddiqui et al. |
| 2007/0171827 | A1 | 7/2007 | Scott et al. |
| 2007/0300239 | A1* | 12/2007 | Adam .................... G06F 9/505 |
| | | | 719/320 |
| 2008/0034419 | A1 | 2/2008 | Mullick et al. |
| 2009/0073878 | A1 | 3/2009 | Carlberg |
| 2009/0119280 | A1 | 5/2009 | Waters et al. |
| 2010/0138688 | A1 | 6/2010 | Sykes et al. |
| 2010/0188976 | A1 | 7/2010 | Rahman et al. |
| 2012/0192016 | A1* | 7/2012 | Gotesdyner ......... H04L 12/6418 |
| | | | 714/47.3 |
| 2012/0215911 | A1* | 8/2012 | Raleigh ................ H04M 15/66 |
| | | | 709/224 |
| 2012/0240110 | A1 | 9/2012 | Breitgand et al. |
| 2013/0166730 | A1 | 6/2013 | Wilkinson |
| 2013/0262703 | A1 | 10/2013 | Dong et al. |
| 2014/0036697 | A1* | 2/2014 | Annan .................... H04L 67/28 |
| | | | 370/252 |
| 2014/0179266 | A1* | 6/2014 | Schultz ............... H04L 12/1435 |
| | | | 455/406 |
| 2014/0237117 | A1* | 8/2014 | Cha .................. H04W 52/0229 |
| | | | 709/224 |
| 2014/0280889 | A1* | 9/2014 | Nispel .................... H04L 63/20 |
| | | | 709/224 |
| 2014/0317280 | A1* | 10/2014 | Ke .................... H04L 41/5067 |
| | | | 709/224 |
| 2015/0163121 | A1 | 6/2015 | Mahaffey et al. |
| 2015/0326486 | A1* | 11/2015 | Zawadowskiy ......... H04L 47/36 |
| | | | 709/224 |
| 2015/0326596 | A1 | 11/2015 | Zhang et al. |
| 2016/0261472 | A1* | 9/2016 | Tubi ...................... H04L 43/065 |
| 2016/0359872 | A1 | 12/2016 | Yadav et al. |
| 2017/0279828 | A1 | 9/2017 | Savalle et al. |
| 2018/0048541 | A1 | 2/2018 | Reilly et al. |
| 2018/0248979 | A1* | 8/2018 | Alisawi ............... G06F 11/3438 |
| 2020/0076909 | A1 | 3/2020 | Kuperman et al. |

OTHER PUBLICATIONS

Author Unknown, "FAQ—Redis," accessed Aug. 2018 from https://redis.io/topics/faq, 4 pages.

Author Unknown, "IPSET," Jun. 25, 2015, http://ipset.netfilter.org/ipset.man.html, 15 pages.

Author Unknown, "NetFlow," Wikipedia, Jun. 22, 2018, https://en.wikipedia.org/wiki/NetFlow, 7 pages.

Author Unknown, "Server Name Indication," Wikipedia, accessed Aug. 2018 from https://en.wikipedia.org/wiki/Server_Name_Indication, 5 pages.

International Search Report and Written Opinion for International Patent Application No. PCT/US2019/046080, dated Oct. 29, 2019, 9 pages.

Non-Final Office Action for U.S. Appl. No. 16/440,996, dated Jul. 7, 2020, 14 pages.

Notice of Allowance for U.S. Appl. No. 16/440,996, dated Oct. 23, 2020, 9 pages.

\* cited by examiner

DETERMINING ACTIVE APPLICATION USAGE THROUGH A NETWORK TRAFFIC HUB

CROSS REFERENCE TO RELATED APPLICATIONS

This application claims priority to and the benefit of U.S. Provisional Application No. 62/723,484, entitled "Local Area Network Security Based on Application Traffic" and filed on Aug. 28, 2018, the content of which is incorporated by reference in its entirety herein.

The present disclosure relates to U.S. patent application Ser. No. 15/099,526 ("App. '526"), entitled "Network Security Analysis for Smart Appliances" and filed on Apr. 14, 2016, the content of which is incorporated by reference.

TECHNICAL FIELD

This application relates generally to network security, and specifically to tracking active usage of an application running on a user device.

BACKGROUND

Client applications running on mobile user devices (e.g., smart phones) typically operate in either active or passive states. An application is typically in an active state when a user is interacting with the application. Furthermore, operations related to an application in an active state typically take priority over applications in passive states. An application is typically in a passive state when a user is not interacting with the application, or when the application is running in the background. For example, an application is in a passive state when the application is running but a user is interacting with another application on the device. In another example, an application is in a passive state when the user device is in a sleep state.

Often, users want to measure active usage of applications on their mobile devices. For example, a parent may desire to know the frequency their child uses an application. However, conventional application usage tracking methods merely track the total network traffic of an application (including passive traffic that was transmitted when the application was in a passive state). Thus, by including passive usage, conventional tracking methods overestimate the active application usage of an application.

BRIEF DESCRIPTION OF THE DRAWINGS

Figures (FIGS. 1A-1B illustrate example system environments for a network traffic hub.

DETAILED DESCRIPTION

Figure 1A:
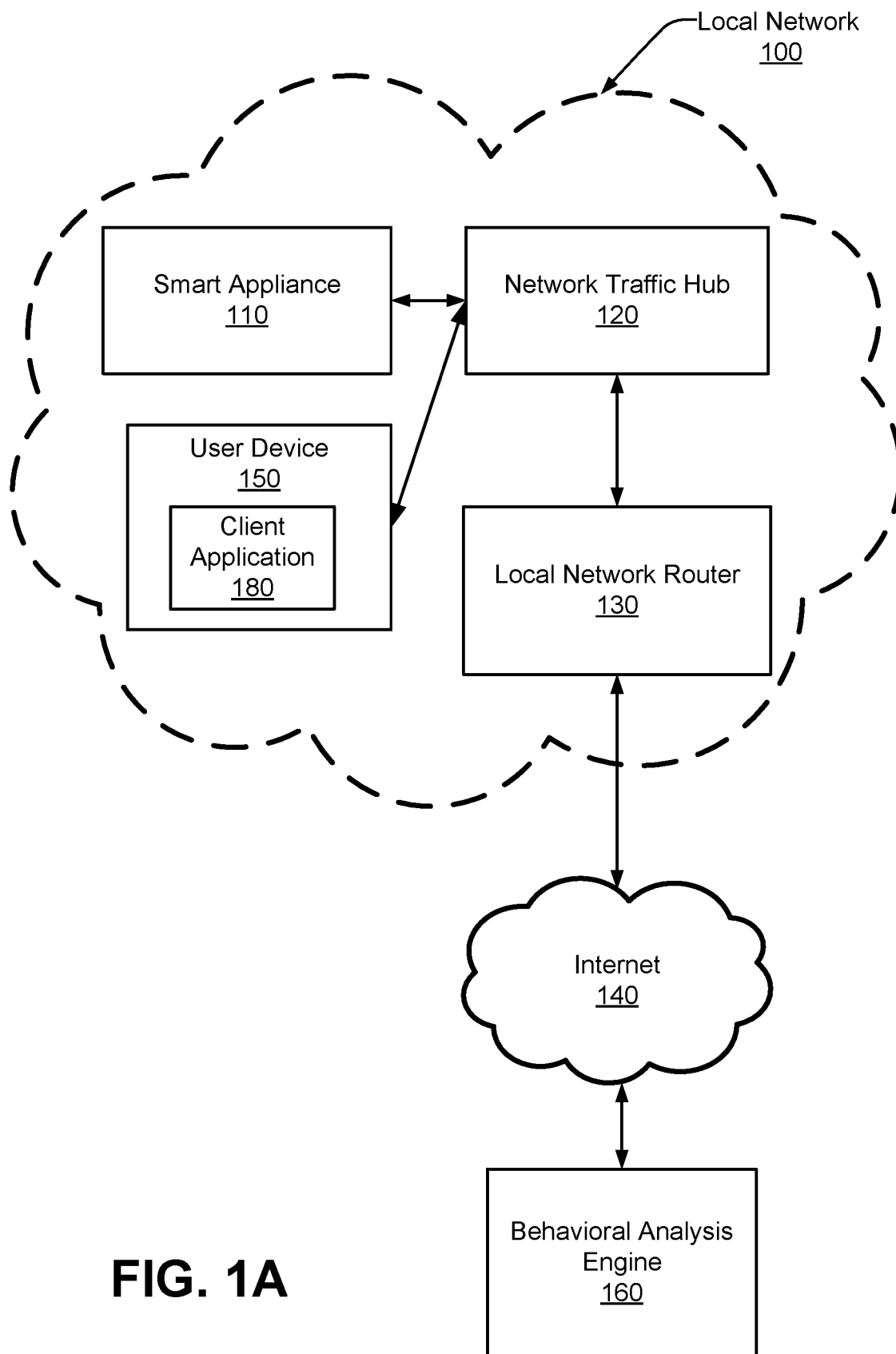
FIG. 1C illustrates an example system environment without a network traffic hub.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments relate to methods for tracking client application usage on a user device on a local network. A network traffic hub in a local network receives network traffic to and from a user device running one or more applications. The network traffic hub aggregates the network traffic into augmented netflows. Based on netflow parameters extracted by the network traffic hub, the augmented netflows are associated with applications running on the user device. The network traffic hub determines whether an augmented netflow (or a group of augmented netflows) is a result of the application being in an active state or a passive state. Since applications in active states typically produce more network traffic than in passive states, this determination can be based on the quantity of data within the augmented netflow (or group of augmented netflows). For example, if the quantity of data within an augmented netflow is larger than a data threshold, the augmented netflow is classified as an active usage, and if the data is less than the data threshold, the augmented netflow is classified as a passive usage. Since the quantity and frequency of active and passive network traffic is different for each application, the data threshold may be different for each application. Thus, by classifying augmented netflows (or groups of augmented netflows) of an application as active or passive, a record of a user's active application usage can be recorded for each application.

If a total active usage of an application exceeds an active usage threshold, the network traffic hub may block subsequent network traffic associated with the application. Alternatively, the network traffic hub may prevent use of the application, provide a notification to a user device (possibly different than the original user device), or conditionally allow subsequent network traffic associated with the application.

In some embodiments, one or more operations described above are performed by a remote behavioral analysis engine outside of the local network. For example, the network traffic hub transmits augmented netflows to a behavioral analysis engine, and the behavioral analysis engine performs operations, such as associating augmented netflows with applications, classifying augmented netflows as active and passive usage, etc.

System Environment and Architecture

Figure 1B:
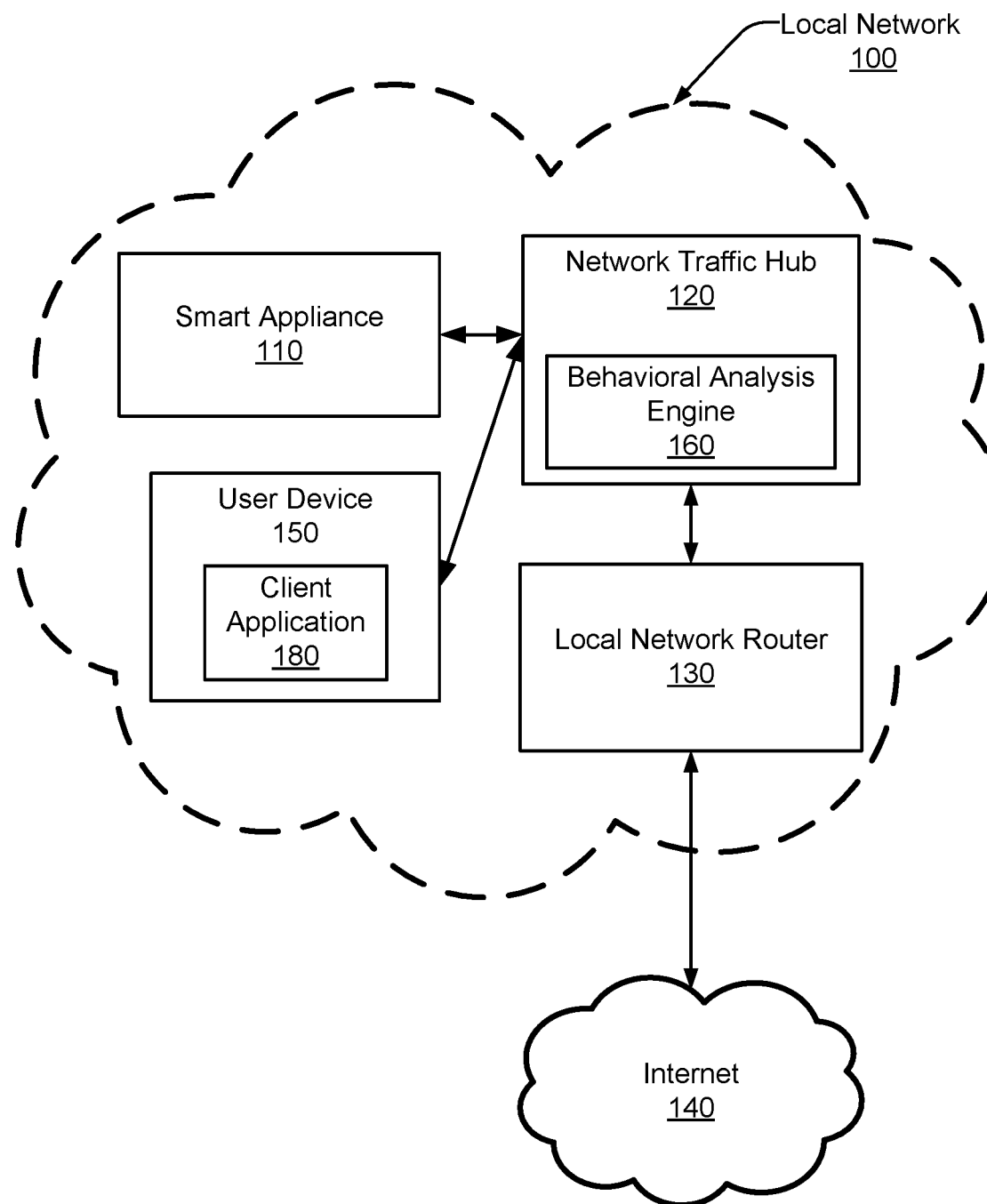
Figure 1C:
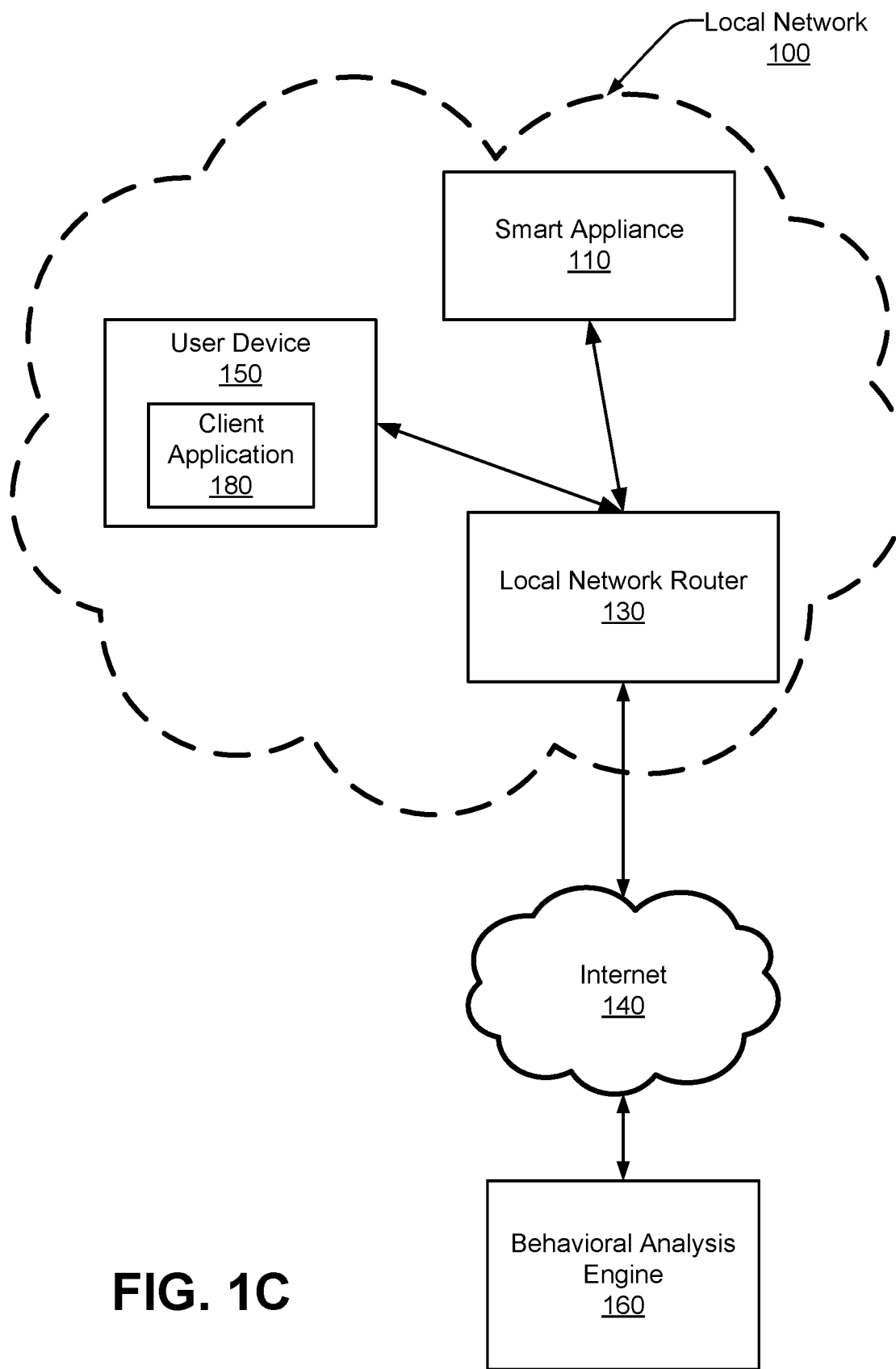

FIG. 1A illustrates an example system environment for a network traffic hub 120. The system environment illustrated in FIG. 1 includes a local network 100 that includes a smart appliance 110, a network traffic hub 120, a local router 130, the Internet 140, a user device 150 with a client application 180, and a behavioral analysis engine 160. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Smart appliances 110 may be electronic, network devices with a limited level of intelligence and processing capabilities. For example, they often lack complex processors and large memory sizes, for example, due to their designed limited functionality and product cost considerations. More particularly, smart appliances 110 are capable of performing moderate amounts of computation that is specific, but limited in scope. To that extent smart appliances 110 are not full-fledged highly computational computing systems capable of complex processing, such as personal computers, smartphones, or tablets. Instead, each smart appliance 110 performs some specific role and the limited intelligence is focused on having the smart appliance 110 perform that specific role effectively. Accordingly, a smart appliance 110 does not have extensive computing resources, e.g., a powerful processor or large quantity of memory. Moreover, keeping computing resources minimal helps keep costs down for the appliances, many of which are staples, for example, in homes or small offices. Examples of appliances that can be smart appliances 110 are refrigerators, freezers, dishwashers, washers, dryers, thermostats, cameras, digital video recorders (DVRs), DVD players, and printers. A smart appliance 110 typically includes a controller or low power processor (generally, processor), a limited amount of memory, and a network interface, which is used to communicate with other network devices.

The smart appliances 110 can use the local network 100 to communicate with other devices. For example, a smart dishwasher can be configured to transmit an alert to a computer or a smartphone on the local network 100 that its cleaning cycle is completed. As another example, a smart light switch can be configured to communicate with a motion sensor via the local network 100 to determine if a person is in a room and whether to power the lights in that room. The smart appliances 110 can also communicate with devices outside of the local network 100 via the internet 140, for example through UPnP port forwarding, or port triggering. A smart appliance 110 can, for example, be configured to receive software updates from remote servers to improve or update its current control functions. Additionally, a smart appliance 110 might receive data from a remote server via the internet 140 that it uses to make decisions (e.g., a smart thermostat might receive weather data to determine heating and cooling settings for a building). In some embodiments, a smart appliance 110 can be configured to receive instructions from a remote server via the internet 140. For example, a smart clock can be configured to receive an instruction from a known server to change the time it displays when daylight savings starts or ends.

The network traffic hub 120 collects information about the local network 100, including data about the network traffic through the local network 100 and data identifying devices in the local network 100, such as the smart appliance 110 and the user device 150. The network traffic hub 120 is also capable of receiving traffic control instructions from the behavioral analysis engine 160 and processing network traffic through the local network 100 based on the traffic control instructions. Processing the network traffic through the local network 100 can include restricting where network traffic can travel, blocking network traffic from entering the local network 100, redirecting a copy of network traffic packets or features of those packets to the behavioral analysis engine 160 for analysis (e.g., for malicious behavior), or quarantining the network traffic to be reviewed by a user (e.g., via the user device 150) or network administrator. In some embodiments, the functionality of the network traffic hub 120 is performed by a device that is a part of the local network 100, while in other embodiments, the functionality of the network traffic hub 120 is performed by a device outside of the local network 100.

The network traffic hub 120 may be configured to monitor traffic that travels through the local network 100. In some embodiments, the network traffic hub 120 can be a device that is a part of the local network 100. The network traffic hub 120 can be connected to the local network 100 using a wired connection (e.g. via an Ethernet cable connected to a router) or using a wireless connection (e.g. via a Wi-Fi connection). In some embodiments, the network traffic hub 120 can comprise multiple devices in the local network 100 that, in conjunction, monitor all traffic that flows through the local network 100. In some embodiments, the network traffic hub 120 performs the functions of the local network router 130 for the local network 100.

In some embodiments, the network traffic hub 120 performs the function of the local network router 130. In some embodiments, the network traffic hub 120 intercepts traffic in the local network 100 by signaling to the smart appliances 110 that the network traffic hub 120 is a router 130. In some embodiments, the network traffic hub 120 replaces the default gateway or gateway address of the local network 100 with its own internet address. For example, the network traffic hub 120 may replace the default gateway of the local network 100 using an address resolution protocol (ARP) or dynamic host configuration protocol (DHCP) man-in-the-middle attack. To perform the man-in-the-middle attack, the network traffic hub 120 may use address resolution protocol (ARP) spoofing/cache poisoning to replace the default gateway. An address resolution protocol (ARP) announcement is sent to signal the smart appliances 100 to transmit network traffic to the network traffic hub 120. In some embodiments, the network traffic hub 120 uses an internet control message protocol (ICMP) attack to replace the default gateway. The network traffic hub 120 also may use a DHCP attack or port stealing to replace the default gateway.

In some embodiments, the local network 100 can be structured such that all network traffic passes through the network traffic hub 120, allowing the network traffic hub 120 to physically intercept the network traffic. For example, the network traffic hub 120 may serve as a bridge through which all network traffic must travel to reach the router 130 of the local network 100.

The behavioral analysis engine 160 may receive and analyze network traffic data (e.g., forwarded by the network traffic hub 120) associated with devices on the local network 100. The behavioral analysis engine 160 may be implemented within a remote system (e.g., a cloud server) or within the local network 100. The behavioral analysis engine 160 may have greater computational resources than the network traffic hub 120. Thus, the behavioral analysis engine 160 may perform operations that are computationally expensive for the network traffic hub 120 to perform. In some embodiments, the behavioral analysis engine 160 replaces the network traffic hub 120 (e.g., see FIG. 1C) by performing the functionalities of the network traffic hub 120. In these embodiments, the local network router 130 may be configured to forward network traffic (e.g., in the form of netflows) to the behavioral analysis engine 160. In some embodiments, the behavioral analysis engine 160 communicates with other devices on the local network 100. For example, if an application 180 running on the user device 150 exhibits malicious behavior, the behavioral analysis engine 160 may transmit a management instruction to the user device 150 to prevent use of the application 180. In some embodiments, the behavioral analysis engine 160 is integrated into the network traffic hub 120 (e.g., see FIG. 1B). The behavioral analysis engine 160 is further described with respect to FIGS. 2 and 3.

The local network 100 is a local area network (LAN) that comprises the smart appliance 110, network traffic hub 120, user device 150, and local network router 130. The local network 100 may be used for a number of purposes, including a home network or a network used by a business. The local network 100 is connected to the internet 140, allowing devices within the local network 100, including the user device 150, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. For example, the internet 140 and the local network 100 may include communication links using technologies such as Ethernet, 802.11, worldwide interoperability for microwave access (WiMAX), 3G, 4G, code division multiple access (CDMA), digital subscriber line (DSL), etc. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The local network router 130 is a networking device that forwards data packets (e.g., internet protocol (IP) packets) between the local network 100 and the internet 140. When a data packet comes in on one of the networks, the router 130 reads the network address (e.g., IP address) information in the data packet to determine the ultimate destination. In some embodiments, the router 130 may perform the DHCP functions of the local network 100. In some embodiments, the router 130 includes other network devices such as a wireless access point or network switch. For example, the router 130 can wirelessly communicate with the network devices in the local network 100 through a wireless access point.

The user device 150 is a computing device capable of receiving user input as well as transmitting and/or receiving data via the internet 140 or local network 100. In some embodiments, a user device 150 is a conventional computer system, such as a desktop or a laptop computer. Alternatively, a user device 150 may be a device having computer functionality, such as a personal digital assistant (PDA), a mobile telephone, a smartphone, or another suitable device. The user device 150 is a network device configured to communicate via the internet 140 or local network 100. In some embodiments, the user device 150 executes an application (e.g., application 180) allowing a user of the user device 150 to interact with other network devices, such as the smart appliance 110, the network traffic hub 120, the router 130, or the behavioral analysis engine 160. For example, the user device 150 executes a browser application to enable interaction between the user device 150 and the network traffic hub 120 via the local network 100. In some embodiments, the user device 150 interacts with other network devices (e.g., the network traffic hub 120) through an application programming interface (API) running on a native operating system of the user device 150, such as IOS® or ANDROID™.

The client application 180 is a computer program or software application configured to run on the user device 150. For example, the application 180 is a web browser, a mobile game, an email client, or a mapping program. The user device 150 can have any number of applications 180 installed. The application 180 may communicate, via the user device 150, with devices inside and outside of the local network 100.

The application 180 operates in either an active or a passive state. In a passive state, the application is running in the background of the user device 150 or is running on an idle device or in an idle state, and may have reduced functionality. In an active state, the application 180 may be receiving input from a user, and may have increased functionality compared to the passive state. Thus, in an active state, the application 180 may transmit and receive increased levels of network traffic compared to the passive state.

Network Traffic Hub

Figure 2:
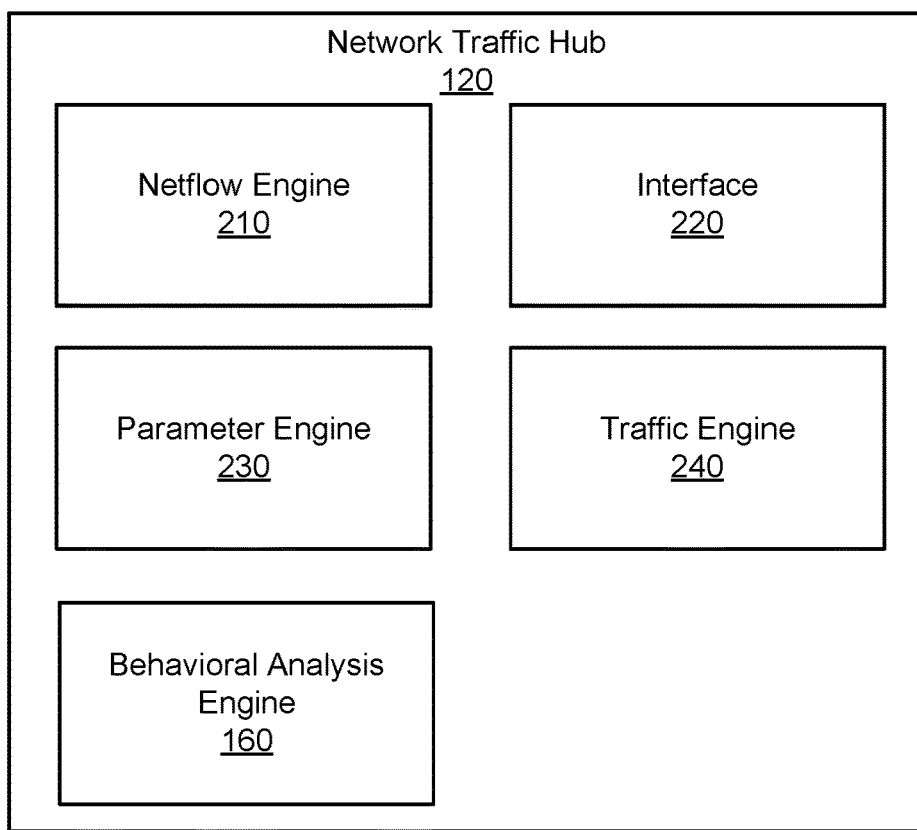
FIG. 2 illustrates a block diagram of the network traffic hub, according to one embodiment.

FIG. 2 illustrates a block diagram of the network traffic hub, according to one embodiment. The network traffic hub 120 includes a netflow engine 210, an interface 220, a parameter engine 230, a traffic engine 240, and a behavioral analysis engine 160. Alternative embodiments may include more, fewer, or different components and the functionality may be divided between the components differently from the description below.

The netflow engine 210 aggregates received network traffic into augmented netflows. An augmented netflow is a sequence of network packets that share common netflow parameters. Examples of netflow parameters include source IP address, destination IP address, IP protocol, source port (e.g., for User Datagram Protocol (UDP) or Transmission Control Protocol (TCP) protocols), destination port, and IP Type of Service (ToS). Network packets may be sampled from network traffic aggregated over a time period ("aggregation time period" hereinafter) to form augmented netflows. During the aggregation time period, network packets are sampled at a predetermined sampling rate. An example sampling rate is one sampled packet per one thousand network packets. In other embodiments, every network packet is sampled. Increasing the sampling rate generally increases accuracy, however it also increases the processing resources used by the network traffic hub 120. Thus, the sampling rate may be selected based on the processing speed of the network traffic hub 120.

Packets sampled during an aggregation time period (e.g., ten seconds) are aggregated to form one or more augmented netflows. The aggregation time period may be predetermined by a network administrator or dynamically determined based on the received network traffic. In some embodiments, the aggregation time period is determined by flow aging. Typically, longer aggregation time periods result in fewer augmented netflows and thus, less computational resources are used to transmit and analyze the augmented netflows. However, longer aggregation time periods increase the time between augmented netflows, and thus, increase the time between augmented netflow transmission and analysis. Conversely, shorter aggregation time periods use more computational resources but decrease the time between augmented netflows. Thus, the length of the aggregation time period may be determined by considering computational resources of the network traffic hub 120 and a desired time between augmented netflows.

The interface 220 provides a communicative interface between components of the network traffic hub 120 and between the network traffic hub itself and one or more other components within or external to the local network 100. In some embodiments, the interface 220 enables the network traffic hub 120 to intercept communications between other components within the local network 100 or between a component within the local network and external to the local network.

The parameter engine 230 extracts supplemental netflow parameters from the sampled network packets. To associate an augmented netflow with an application 180, additional parameters other than the netflow parameters may be beneficial (e.g., attributes associated with the Application Layer). Example supplemental parameters include the server name identification (SNI), user agent (UA), network protocol (e.g., QUIC and transport layer security (TLS)), and GQUIC attributes (e.g., tag.sni and tag.uaid). In some embodiments, "augmented netflow" refers to a sequence of network packets associated with netflow parameters and supplemental parameters. The parameter engine 230 inspects sampled packets using packet payload inspection techniques to extract these supplemental parameters. For example, one or more supplemental parameters are extracted from packets exchanged while implementing a network traffic encryption protocol handshake. Often applications 180 establish a secure connection (e.g., with a remote server via the internet 140) before transmitting and receiving data. Since packets to and from the user device 150 flow through the network traffic hub 120 and since the initial packets in an encryption protocol handshake are not encrypted, the parameter engine 230 may inspect and extract supplemental parameters, such as SNI and UA, from these initial packets.

The traffic engine 240 associates supplemental parameters from the parameter engine 230 with newly sampled packets. As previously described, some supplemental parameters are determined during an initial encryption protocol handshake but are not discernable in subsequent packets since the subsequent packets are encrypted. Thus, the traffic engine 240 tags all subsequent network packets in that encrypted communication with the supplemental parameters extracted during the initial handshake. For example, consider an HTTPS connection over Port 443/TCP. Only the first packet contains the "Client Hello" attributes where the SNI can be extracted. However, once the SNI is extracted, all subsequent packets in the TCP connection can now be linked with the SNI.

The behavioral analysis engine 160 receives and analyzes augmented netflows based on their parameters and the amount of data in the augmented netflows. As previously described, the behavioral analysis engine 160 may be integrated into the network traffic hub 120 or may be physically separate from the network traffic hub 120 (e.g., the behavioral analysis engine 160 is a part of a remote server and the behavioral analysis engine 160 communicates with the network traffic hub 120 via the internet 140). The behavioral analysis engine 160 is further described with reference to FIG. 3.

Behavioral Analysis Engine

Figure 3:
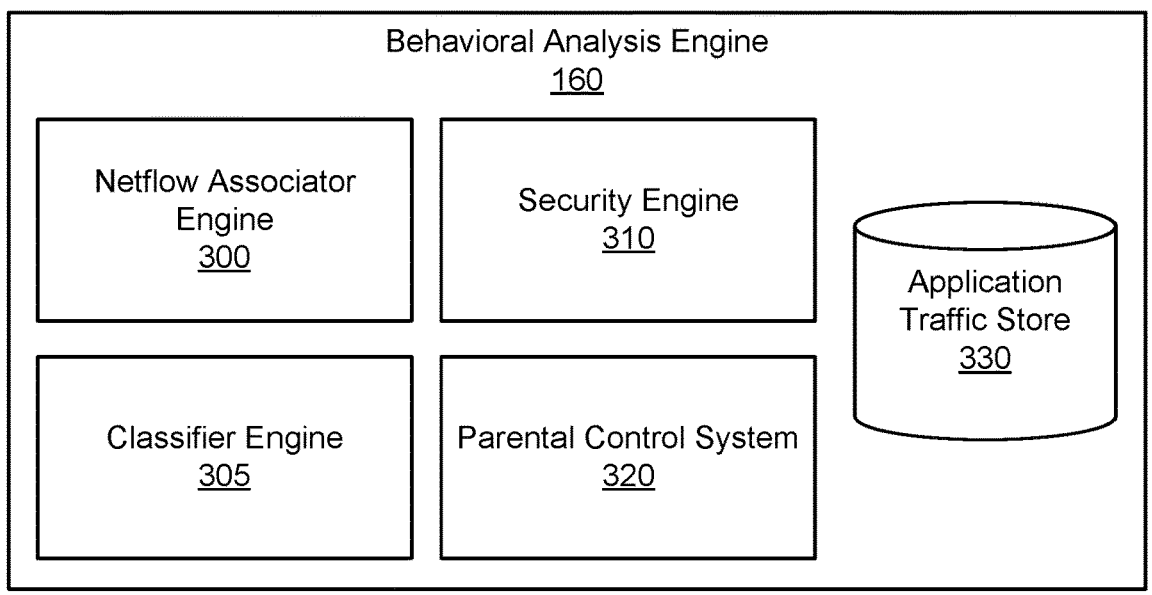
FIG. 3 illustrates a block diagram of the behavioral analysis engine, according to one embodiment.

FIG. 3 illustrates a block diagram of the behavioral analysis engine 160, according to one embodiment. The behavioral analysis engine 160 includes a netflow associator engine 300, a classifier engine 305, a security engine 310, a parental control system 320, and an application traffic store 330. Alternative embodiments may include more, fewer, or different components and the functionality may be divided between the components differently from the description below.

The netflow associator engine 300 determines if an augmented netflow is associated with an application 180 by analyzing the netflow parameters and the supplemental parameters of the netflow. Using netflow parameters and the supplemental parameters, the netflow associator engine 300 may reference a look up table or a set of rules to associate an augmented netflow with an application 180. The look up table or set of rules may be pre-determined or pre-generated by recording network traffic from applications 180 in a testing environment. In some embodiments, the look up table or set of rules is dynamically updated as new applications 180 become available for installation on the user device 150.

After an augmented netflow is associated with a client application by the netflow associator engine 300, the classifier engine 305 classifies the augmented netflow as active or passive usage. Specifically, based on network packets in the netflow, the classifier engine 305 determines whether the associated application 180 is operating in a passive or active state on the user device 150. This determination may be based on a total quantity of data within the netflow. The total quantity of data in the augmented netflow may be the inbound, outbound, or total packet count or byte count of the netflow. If the total quantity of data within the augmented netflow is above a data threshold, the augmented netflow is classified as active usage. Conversely, if the total quantity of data is below the data threshold, the augmented netflow is classified as passive usage. The data threshold may be predetermined and based on the operating system of the user device 150 and the application 180. For example, for a given application 180 and operating system, a look up table provides the data threshold for the netflow. The data threshold may also be based on the whether the packets in an augmented netflow are being transmitted to the user device 150 or from the user device 150.

In some embodiments, instead of classifying each augmented netflow as active or passive usage, groups of augmented netflows associated with an application are classified as active or passive usage. The augmented netflows may be grouped according to time periods. For example, augmented netflows are aggregated according to one-minute time periods. To classify the groups as active or passive usage, a total quantity of data (e.g., inbound, outbound, or total packet count or byte count) of the group may be determined and compared to a data threshold.

The security engine 310 determines whether a total amount of active usage for an application 180 exceeds an active usage threshold. Each application 180 installed on the user device 150 may have a separate active usage threshold associated with it, and the active usage thresholds may be provided by the parental control system 320. The total amount of active usage for an application 180 is the sum of the augmented netflows associated with the application 180 and classified as active usage. For example, the total amount of active usage is the total number of packets or bytes within active usage augmented netflows. In another example, if active usage is determined by grouping augmented netflows according to time periods, the total amount of active usage is the sum of time periods classified as active (e.g., see detailed description of FIG. 4). Additionally, the total amount of active usage may be the sum of the augmented netflows (or groups of augmented netflows) classified as active usage within a time interval (e.g., within the last twenty-four hours or since 12:00 AM today), or may be a percentage of augmented netflows classified as active usage within a time interval.

The security engine 310 may determine whether the total amount of active usage for an application 180 (e.g., the sum of augmented netflows associated with the application and classified as active usage) exceeds the active usage threshold for the application 180 (e.g., the maximum amount of time set by a parent for a child's device and the like).

If the total amount of active usage exceeds the active usage threshold, the security engine 310 provides a network traffic management instruction to the network traffic hub 120. The network traffic management instruction instructs the network traffic hub 120 to perform one or more actions determined by the parental control system 320. Additionally or alternatively, the network traffic management instruction may be sent to the user device 150 to perform the one or more actions.

The network traffic management instruction may instruct the network traffic hub 120 to block subsequent traffic associated with the application 180. To block traffic associated with the application, the network traffic hub 120 may drop packets (e.g., UDP packets) associated with the application 180. Other examples of blocking traffic include dropping the connection associated with the client application 180, redirecting traffic (e.g., if an HTTP protocol is being used), resetting the connection (e.g., using a TCP reset flag), and rejecting a follow-on connection. According to the management instruction, traffic may be blocked for a time period (e.g., thirty minutes), until a date and time are reached (e.g., 8:00 AM the following day), or until another user device (e.g., operated by a network administrator) allows traffic to be transmitted.

The network traffic management instruction may provide instructions to prevent use of the client application 180. For example, the user device 150 is instructed to shut down the application 180 or stop the application 180 from transmitting or receiving network traffic, or to limit the functionality of the application 180.

The network traffic management instruction may instruct the network traffic hub 120 to provide a notification to the user device 150. This may inform the user of the device 150 that the total amount of active usage for the application 180 exceeds an active usage threshold.

The network traffic management instruction may instruct the network traffic hub 120 to provide a notification to another user device (e.g., operated by a network administrator). This allows the other user device to track the application usage of the user device 150. For example, if the user device 150 is operated by a child, the notification is sent to a user device operated by the child's parent.

The network traffic management instruction may instruct the network traffic hub 120 to conditionally allow subsequent network traffic associated with the application 180 to be transmitted to and from the user device 150. For example, passive network traffic associated with the application 180 is allowed to be transmitted, but active network traffic is blocked by the network traffic hub 120. In another example, network traffic is allowed to be transmitted until the total amount of active usage exceeds a second active data threshold.

The parental control system 320 provides, to the security engine 310, the active usage thresholds and the actions to be taken if the total amount of active usage exceeds the active usage thresholds. In some embodiments, thresholds and actions are specific to one or more applications 180. Thus, the thresholds and actions may be different for each application 180 and some applications may not have active usage thresholds associated with them. The thresholds and actions may be determined or adjusted by a network administrator. The parental control system 320 may also specify customer accounts, user profiles and user devices 150 associated with the user profiles, applications 180 to track, etc.

The application traffic store 330 stores augmented netflows received by the network traffic hub 120. The application traffic store 330 also stores a total amount of usage of applications 180 (e.g., within a time interval). The total amount of usage includes the total amount of active and passive usage. Thus, a total amount of usage (e.g., active usage) of applications 180 can be determined by referencing the application traffic store 330. In some embodiments, the behavioral analysis engine 160 is communicatively connected to multiple local networks 100 (e.g., each with a network traffic hub 120). In these embodiments, the application traffic store 330 may store augmented netflows from the each of the local networks 100.

Example Activity Timeline

Figure 4:
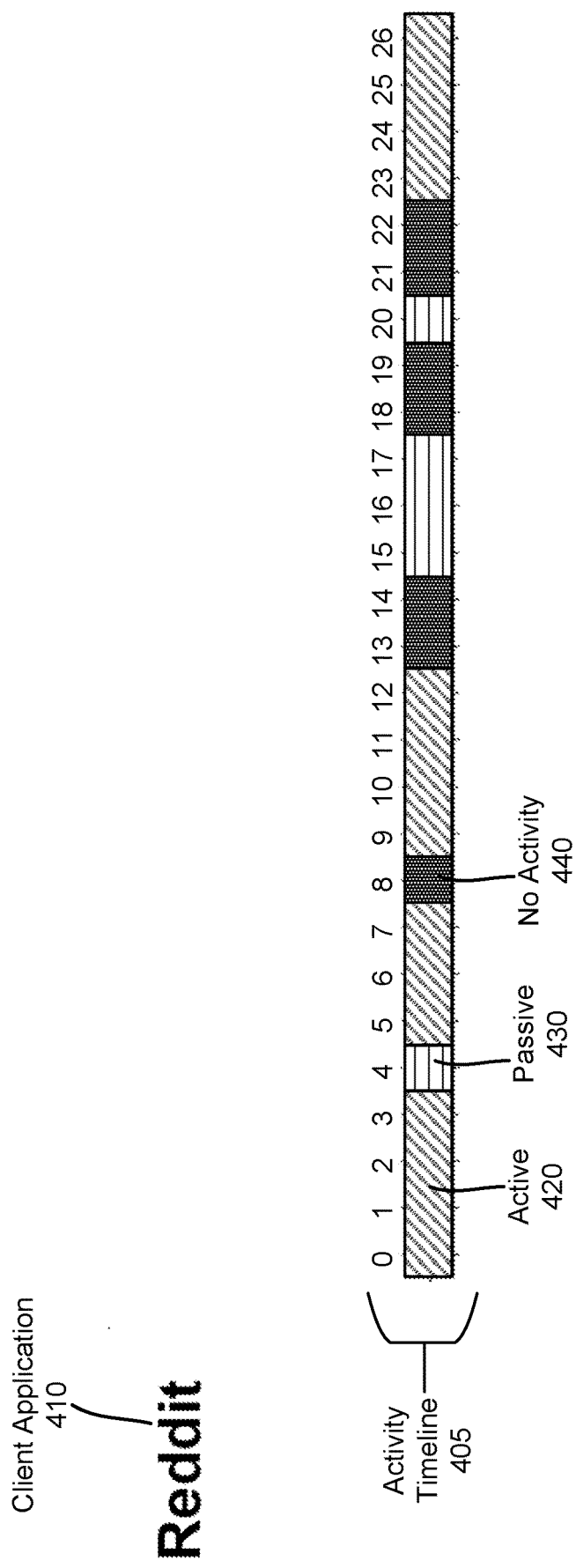
FIG. 4 illustrates an activity timeline for an application, according to one embodiment.

FIG. 4 illustrates an activity timeline 405 for an example client application 410, according to one embodiment. The timeline represents total usage of the application 410 by a user device 150 for a time period. The timeline indicates periods of active usage 420, passive usage 430, and no activity 440. The x-axis represents time. For example, the timeline 405 represents the activity of the application 410 over a twenty-six-minute time period. In this embodiment, augmented netflows are grouped in one-minute time periods and each group is classified as active usage 420, passive usage 430, or no activity 440. For example, a first data threshold differentiates between active usage 420 and passive usage 430 and a second data threshold differentiates between passive usage 430 and no activity 440.

In another example embodiment, the unit of time of the timeline 405 is the netflow aggregation time period (see description with reference to the netflow engine 210). Thus, the indicated usages (420, 430, and 440) for each time unit represent the classification of a single augmented netflow (or in some cases the absence of a netflow) as active usage 420, passive usage 430, or no activity 440.

Example Processes for Tracking Active Usage

Figure 5:
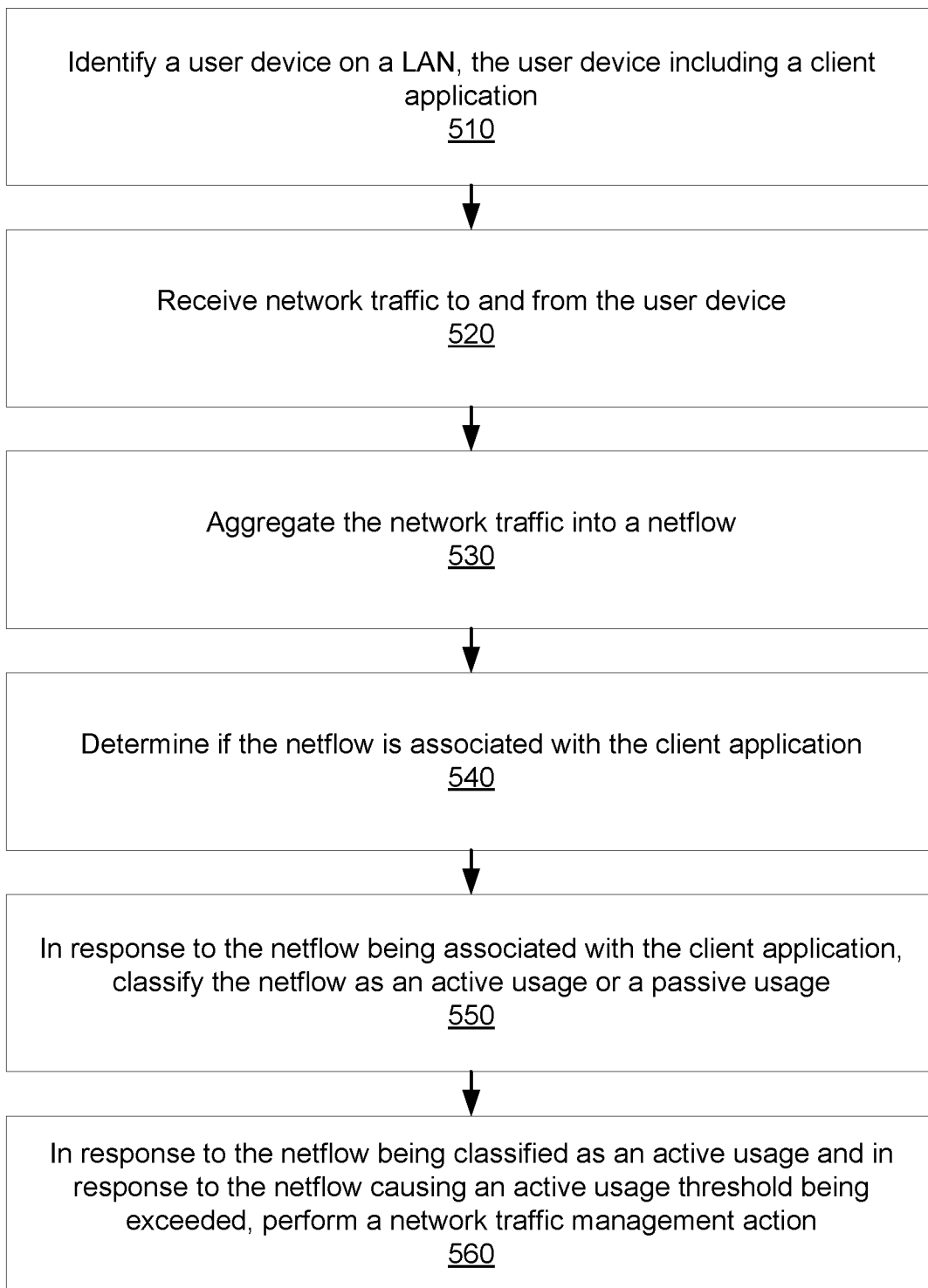
FIG. 5 illustrates a process for a network traffic hub to classify and track active usage of an application running on a user device, according to one embodiment.

FIG. 5 illustrates a process for a network traffic hub in a local network to classify and track active usage of a client application running on a user device, according to one embodiment. Alternative embodiments may include more, fewer, or different steps, and the steps may be performed in a different order from the one presented in FIG. 5.

A network traffic hub identifies 510 a user device on a local network. The user device includes a client application. The network traffic hub receives 520 network traffic to and from the user device. The network traffic hub may receive the network traffic to and from the user device by intercepting the network traffic.

The network traffic hub aggregates 530 the network traffic into a netflow.

A behavioral analysis engine of the network traffic hub determines 540 if the augmented netflow is associated with the client application. The determination is based on parameters of the network traffic. The parameters may be extracted from packets exchanged while implementing a network traffic encryption protocol handshake. The parameters may comprise at least one of a server name indication (SNI), a user agent, and a communication protocol of the network traffic.

In response to the augmented netflow being associated with the client application, the behavioral analysis engine classifies 550 the augmented netflow as an active usage of the client application or a passive usage of the client application. The classification may be based on a quantity of data within the augmented netflow associated with the client application. In some embodiments, the classification is made by comparing the quantity of data within the augmented netflow to a data threshold associated with the client application. The data threshold associated with the client application may be based on an operating system of the user device.

In response to the augmented netflow being classified as an active usage of the client application and in response to the augmented netflow causing an active usage threshold associated with the client application to be exceeded, the network traffic hub performs 560 a network traffic management action in response to receiving subsequent network traffic associated with the client application.

In some embodiments, the behavioral analysis engine has a plurality of active usage thresholds, and each of the active usage thresholds are associated with one of a plurality of client applications on the user device. In some embodiments, the active usage threshold is set by a user of another user device, such as a parent of a user of the application.

In some embodiments, the network traffic management action includes at least one of four actions. A first action blocks subsequent network traffic associated with the client application. The second action provides a notification to another user device. A third action provides a notification to the user device. A fourth action conditionally allows subsequent network traffic associated with the client application to be transmitted to and from the user device.

Figure 6:
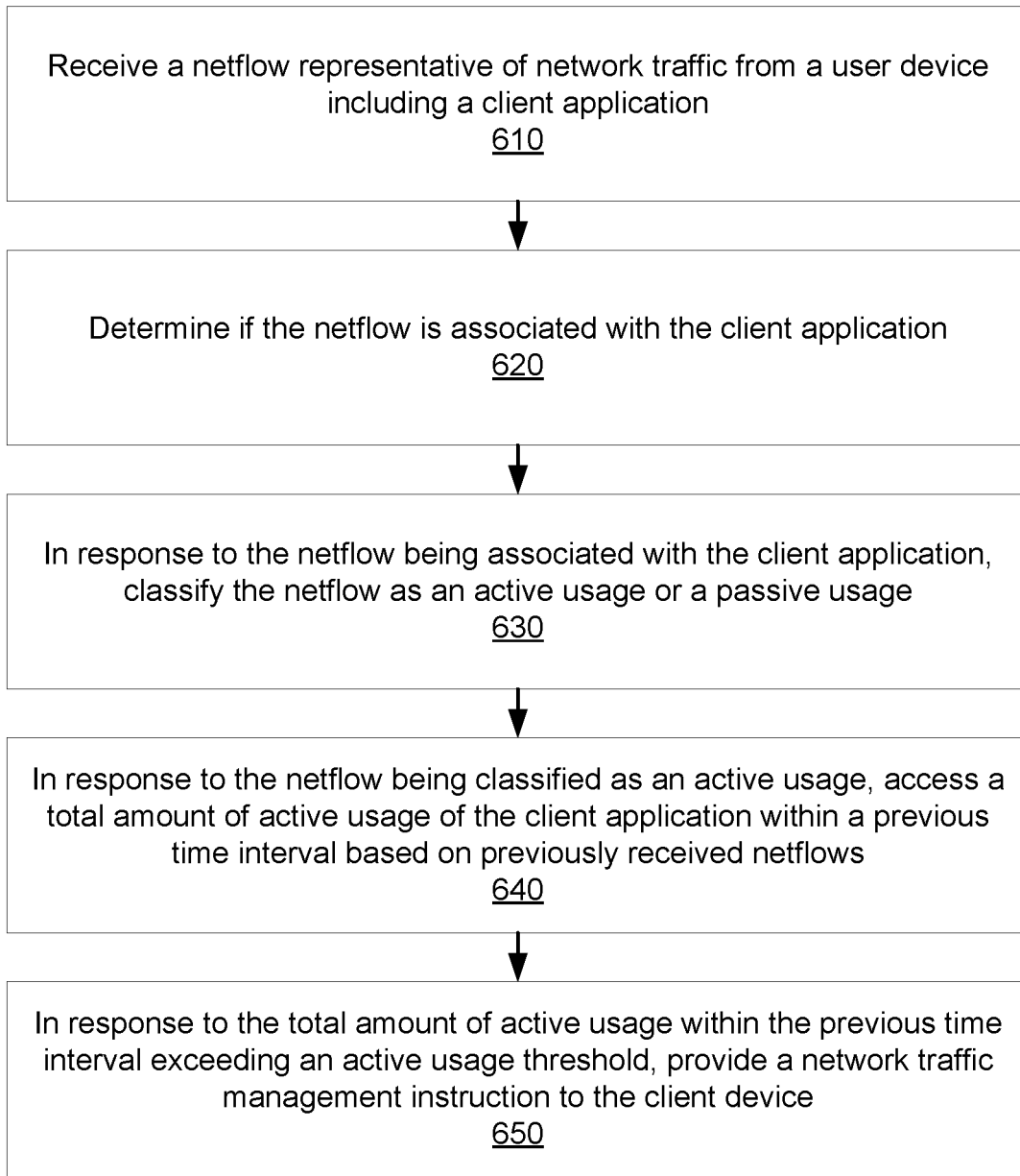
FIG. 6 illustrates a process for a cloud server to classify and track active usage of an application running on a user device, according to one embodiment.

FIG. 6 illustrates a process for a cloud server to classify and track active usage of a client application running on a user device, according to one embodiment. Alternative embodiments may include more, fewer, or different steps, and the steps may be performed in a different order from the one presented in FIG. 6.

A cloud server receives 610 an augmented netflow representative of network traffic from a user device. The user device includes a client application.

The cloud server determines 620 the augmented netflow is associated with the client application. The cloud server may make this determination by identifying an internet protocol (IP) address associated with the netflow, accessing a lookup table that maps IP addresses to client applications. In some embodiments, the cloud server makes this determination by identifying a port number associated with the netflow, and accessing a table that maps port numbers to client applications.

In response to the augmented netflow being associated with the client application, the cloud server classifies 630 the augmented netflow as an active usage of the client application or a passive usage of the client application. The classification may be based on a quantity of data within the augmented netflow associated with the client application. The classification may include comparing the quantity of data within the augmented netflow to a data threshold associated with the client application. In some embodiments, the data threshold associated with the client application is at least based on an operating system of the user device.

In response to the augmented netflow being classified as an active usage of the client application, the cloud server accesses 640 a total amount of active usage of the client application within a previous time interval based on previously received augmented netflows representative of network traffic from the user device. The total amount of active usage is a sum of the augmented netflows associated with the application and classified as active usage.

In response to the total amount of active usage of the client application within the previous time interval exceeding an active usage threshold, the cloud server provides 650 a network traffic management instruction to the user device. The cloud server may have a plurality of active usage thresholds, wherein each of the active usage thresholds are associated with one of a plurality of client applications on the user device. In some embodiments, the active usage threshold is set by a user of another user device.

In some embodiments, the network traffic management instruction includes instructions to perform at least one of five actions. A first action blocks subsequent network traffic associated with the client application. A second action prevents use of the client application. A third action provides a notification to the user device. A fourth action provides a notification to another user device. A fifth action conditionally allows subsequent network traffic associated with the client application to be transmitted to and from the user device.

Architecture of Devices

Figure 7:
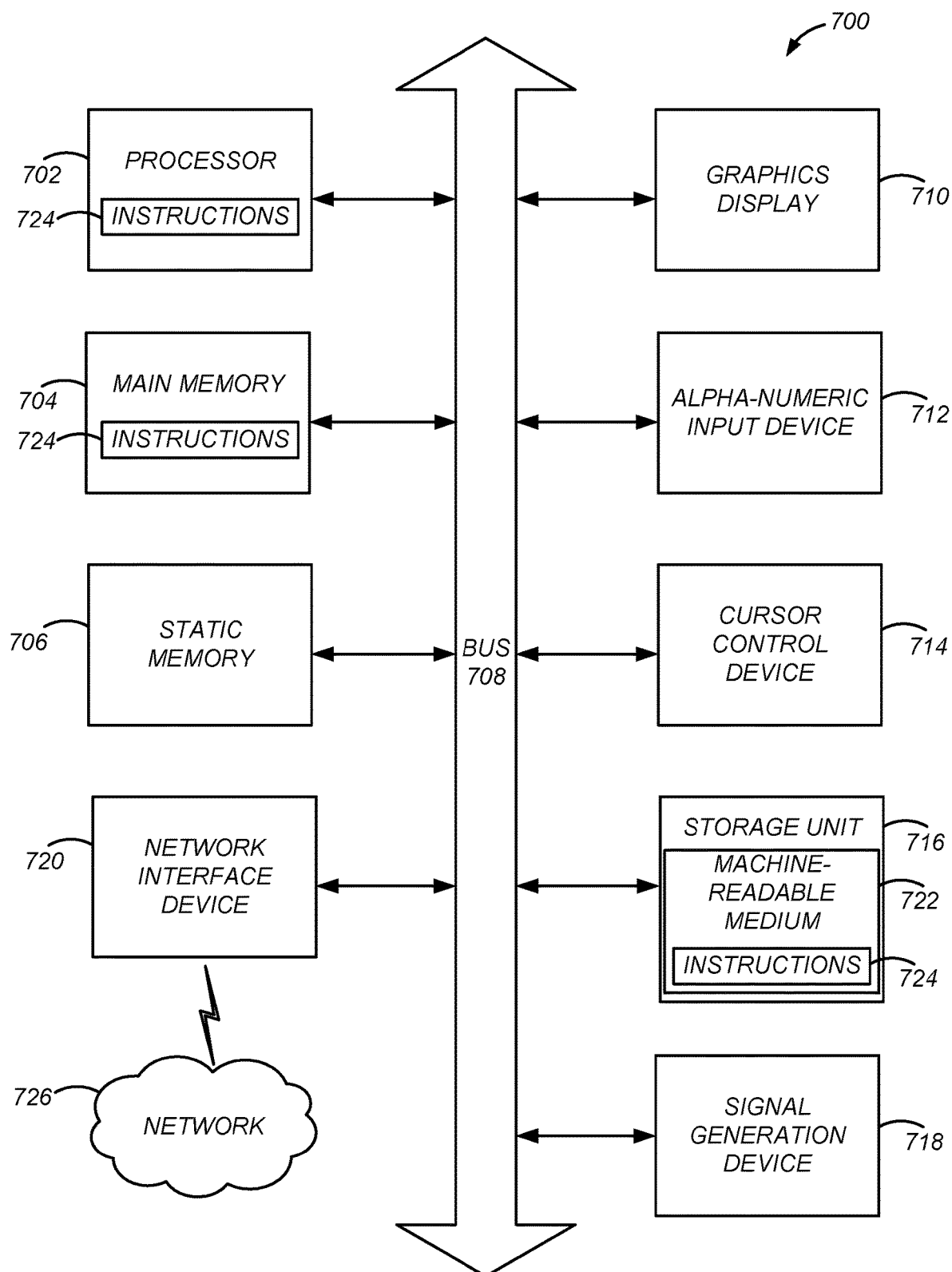
FIG. 7 is a block diagram illustrating components of an example machine able to read and execute instructions from a machine-readable medium.

FIG. 7 is a block diagram illustrating components of an example machine able to read and execute instructions from a machine-readable medium. Specifically, FIG. 7 shows a diagrammatic representation of a machine in the example form of a computer system 700. The computer system 700 can be used to execute instructions 724 (e.g., which forms program code or software) for causing the machine to perform any one or more of the methodologies (or processes) described herein. In alternative embodiments, the machine operates as a standalone device or a connected (e.g., network) device that connects to other machines. In a network deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, a network traffic hub, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720. The network interface device 720 may include a wired or wireless network interface controller that can communicate with other network devices via wired and/or wireless technologies. This may include Ethernet, 802.11, worldwide interoperability for microwave access (WiMAX), 3G, 4G, code division multiple access (CDMA), digital subscriber line (DSL), etc.

While machine-readable medium 722 is shown in an embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" shall also be taken to be a non-transitory machine-readable medium. The term "machine-readable medium" includes, but not be limited to, data repositories in the form of solid-state memories, optical media, and magnetic media.

Additional Considerations

The disclosed computing configurations provide numerous benefits and advantages. For example, benefits and advantages may include improving the accuracy of calculating active usage of an application on a user device. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-7. Engines and modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module or engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware module or engine may also comprise programmable logic or circuitry (e.g., as encompassed within a general-purpose processor or other programmable processor) that is temporarily configured by software to perform certain operations. It will be appreciated that the decision to implement a hardware module or engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules or engines referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory 704). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for classifying and tracking active application usage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

What is claimed is:

1. A method, comprising:
    receiving, by a cloud server, an augmented netflow representative of network traffic from a user device including a client application, the augmented netflow comprising a plurality of sampled packets selected from the network traffic, wherein the plurality of sampled packets are aggregated from a larger number of packets from the network traffic over an aggregation time period;
    determining, by the cloud server, based at least in part on content of one or more of the sampled packets in the augmented netflow, that the augmented netflow is associated with the client application;
    in response to determining that the augmented netflow is associated with the client application, classifying, by the cloud server, the augmented netflow as an active usage of the client application or a passive usage of the client application based on the sampled packets of the augmented netflow, wherein an active usage classification is deemed to constitute network traffic caused by user interactions with the client application and a passive usage classification is deemed to constitute network traffic not caused by user interactions with the client application;
    in response to classifying the augmented netflow as an active usage of the client application, accessing, by the cloud server, a total amount of active usage of the client application within a previous time interval based on previously received augmented netflows representative of previous network traffic from the user device that were previously classified as active usage augmented netflows, the previously received augmented netflows comprising a plurality of packets aggregated from a larger number of packets from the previous network traffic received over a previous different aggregation time period; and
    in response to the total amount of active usage of the client application within the previous time interval exceeding an active usage threshold, providing, by the cloud server, a network traffic management instruction to the user device to control subsequent traffic of the client application.

2. The method of claim 1, wherein classifying the augmented netflow as an active usage of the client application or a passive usage of the client application is based on a quantity of data within the augmented netflow associated with the client application.

3. The method of claim 2, wherein classifying the augmented netflow as an active usage of the client application or a passive usage of the client application based on a quantity of data within the augmented netflow associated with the client application comprises:
    comparing the quantity of data within the augmented netflow to a data threshold associated with the client application.

4. The method of claim 3, wherein the data threshold associated with the client application is at least based on an operating system of the user device.

5. The method of claim 1, wherein the network traffic management instruction includes instructions to perform an action including at least one of: blocking subsequent network traffic associated with the client application, preventing use of the client application, providing a notification to the user device, provide a notification to another user device, and conditionally allowing subsequent network traffic associated with the client application to be transmitted to and from the user device.

6. The method of claim 1, wherein the cloud server has a plurality of active usage thresholds, wherein each of the active usage thresholds are associated with one of a plurality of client applications on the user device.

7. The method of claim 1, wherein the active usage threshold is set by a user of another user device.

8. The method of claim 1, wherein determining if the augmented netflow is associated with the client application comprises:
    identifying an internet protocol (IP) address associated with the netflow; and
    accessing a lookup table that maps IP addresses to client applications.

9. The method of claim 1, wherein determining if the augmented netflow is associated with the client application comprises:
    identifying a port number associated with the augmented netflow; and
    accessing a table that maps port numbers to client applications.

10. The method of claim 1, wherein the total amount of active usage of the client application within a previous time interval based on previously received augmented netflows representative of network traffic from the user device is a sum of the augmented netflows associated with the application and classified as active usage.

11. The method of claim 1 wherein the content of the one or more sampled packets comprises one or more of a server name identification, a user agent, and a network protocol.

12. The method of claim 1 wherein the content is determined from sampled packets exchanged during a network traffic encryption protocol handshake.

13. A non-transitory computer-readable medium comprising stored program code, the program code comprised of computer-executable instructions that, when executed by a processor, causes the processor to:

receive, by a cloud server, an augmented netflow representative of network traffic from a user device including a client application, the augmented netflow comprising a plurality of sampled packets selected from the network traffic, wherein the plurality of sampled packets are aggregated from a larger number of packets from the network traffic over an aggregation time period;

determine, by the cloud server, if the augmented netflow is associated with the client application;

in response to determining that the augmented netflow is associated with the client application, classify, by the cloud server, the augmented netflow as an active usage of the client application or a passive usage of the client application based on the sampled packets of the augmented netflow, wherein an active usage classification is deemed to constitute network traffic caused by user interactions with the client application and a passive usage classification is deemed to constitute network traffic not caused by user interactions with the client application;

in response to classifying the augmented netflow as an active usage of the client application, access, by the cloud server, a total amount of active usage of the client application within a previous time interval based on previously received augmented netflows representative of previous network traffic from the user device, the previously received augmented netflows comprising a plurality of packets aggregated from a larger number of packets from the previous network traffic received over a previous different aggregation time period;

access a plurality of active usage thresholds, each active usage threshold corresponding to a different client application of a plurality of client applications, to determine an active usage threshold of the plurality of active usage thresholds that corresponds to the client application; and in response to the total amount of active usage of the client application within the previous time interval exceeding the active usage threshold, provide, by the cloud server, a network traffic management instruction to the user device to control subsequent traffic of the client application.

14. The non-transitory computer-readable medium of claim 13, wherein classifying the augmented netflow as an active usage of the client application or a passive usage of the client application is based on a quantity of data within the augmented netflow associated with the client application.

15. The non-transitory computer-readable medium of claim 13, wherein the data threshold associated with the client application is at least based on an operating system of the user device.

16. The non-transitory computer-readable medium of claim 13, wherein the network traffic management instruction includes instructions to perform an action including at least one of: blocking subsequent network traffic associated with the client application, preventing use of the client application, providing a notification to the user device, provide a notification to another user device, and conditionally allowing subsequent network traffic associated with the client application to be transmitted to and from the user device.

17. The non-transitory computer-readable medium of claim 13, wherein the active usage threshold is set by a user of another user device.

18. The non-transitory computer-readable medium of claim 13, wherein the instruction to determine if the augmented netflow is associated with the client application further causes the processor to:
identify an internet protocol (IP) address associated with the netflow; and
access a lookup table that maps IP addresses to client applications.

19. The non-transitory computer-readable medium of claim 13, wherein determining if the augmented netflow is associated with the client application comprises:
identifying a port number associated with the netflow; and
accessing a table that maps port numbers to client applications.

20. The non-transitory computer-readable medium of claim 13, wherein the total amount of active usage of the client application within a previous time interval based on previously received augmented netflows representative of network traffic from the user device is a sum of the augmented netflows associated with the application and classified as active usage.

21. A computer system comprising:
a processor; and
a non-transitory computer-readable medium comprising stored program code, the program code comprised of computer-executable instructions that, when executed by the processor, causes the processor to:
receive, by a cloud server, an augmented netflow representative of network traffic from a user device including a client application, the augmented netflow comprising a plurality of sampled packets selected from the network traffic, wherein the plurality of sampled packets are aggregated from a larger number of packets from the network traffic over an aggregation time period;
identify an internet protocol (IP) address associated with the augmented netflow;
access a lookup table that maps the IP address to the client application to determine, by the cloud server, that the augmented netflow is associated with the client application;
in response to determining that the augmented netflow is associated with the client application, classify, by the cloud server, the augmented netflow as an active usage of the client application or a passive usage of the client application based on the sampled packets of the augmented netflow, wherein an active usage classification is deemed to constitute network traffic caused by user interactions with the client application and a passive usage classification is deemed to constitute network traffic not caused by user interactions with the client application;
in response to classifying the augmented netflow as an active usage of the client application, determine, by the cloud server, a total amount of active usage of the client application within a previous time interval based on an amount of active usage associated with each of a plurality of previously received augmented netflows representative of previous network traffic from the user device within the previous time interval, the previously received augmented netflows comprising a plurality of packets aggregated from a larger number of packets from the previous network traffic received over a previous different aggregation time period; and
in response to the total amount of active usage of the client application within the previous time interval exceeding an active usage threshold, provide, by the cloud server, a network traffic management instruction to the user device to control subsequent traffic of the client application.

* * * * *